United States Patent [19]

Kozyrski et al.

[11] Patent Number: 5,099,727
[45] Date of Patent: Mar. 31, 1992

[54] MECHANISM AND METHOD FOR CIRCUMSCRIBING OVAL SHAPES

[75] Inventors: Vincent T. Kozyrski, Plainville, Conn.; Alan R. Peters, Cape Coral, Fla.

[73] Assignee: The Fletcher-Terry Company, Farmington, Conn.

[21] Appl. No.: 676,797

[22] Filed: Mar. 28, 1991

Related U.S. Application Data

[63] Continuation-in-part of Ser. No. 429,009, Oct. 30, 1989, Pat. No. 5,033,346, which is a continuation-in-part of Ser. No. 380,217, Jul. 14, 1989, Pat. No. 5,014,584.

[51] Int. Cl.$^5$ .................... B23B 41/04; B26D 3/10
[52] U.S. Cl. .................... 82/1.3; 82/46; 83/464; 83/522.15; 83/523; 83/591; 33/31
[58] Field of Search ............... 83/464, 522.15, 522.18, 83/522.19, 564, 565, 523, 578, 646, 186, 591; 33/30.1, 30.6, 31; 82/1.3, 18, 46

[56] References Cited

U.S. PATENT DOCUMENTS

| | | | |
|---|---|---|---|
| 3,845,676 | 11/1974 | Pierce | 83/523 X |
| 4,112,793 | 9/1978 | Pierce | 83/464 X |
| 4,174,572 | 11/1979 | Mikulin | 33/31 |
| 4,244,106 | 1/1981 | Pierce | 33/31 |
| 4,790,222 | 12/1988 | Morgan | 83/523 X |
| 4,878,409 | 11/1989 | Carithers, Jr. | 83/564 X |

FOREIGN PATENT DOCUMENTS 680311 8/1939 Fed. Rep. of Germany .

Primary Examiner—Douglas D. Watts
Assistant Examiner—C. Dexter
Attorney, Agent, or Firm—Ira S. Dorman

[57] ABSTRACT

A mechanism is provided for circumscribing oval paths, wherein a pivotably mounted element is dynamically oriented so as to maintain a functional axis thereof constantly tangent to the circumscribed path. An orienting arm attached to the mounted element is arcuately reciprocated by an element moving unidirectionally in a circle, the direction of circular movement being opposite to that in which the mounted element proceeds.

11 Claims, 9 Drawing Sheets

MECHANISM AND METHOD FOR CIRCUMSCRIBING OVAL SHAPES

CROSS REFERENCE TO RELATED APPLICATIONS

This application is a continuation-in-part of copending application Ser. No. 07/429,009, filed Oct. 30, 1989 and now issued as U.S. Pat. No. 5,033,346, which in turn is a continuation-in-part of copending application Ser. No. 07/380,217, filed July 14, 1989 and now issued as U.S. Pat. No. 5,014,584, the benefit of the filing dates of which are hereby claimed.

BACKGROUND OF THE INVENTION

Sheets of cardboard mat, glass and other materials are frequently cut to provide components having openings and/or perimeters of circular or elliptical (generally referred to as "oval") configuration. Such components are widely used for mounting and framing of pictures and the like.

Machines are known in the art, and are commercially available, for cutting planar workpieces to such shapes; exemplary is the device described in Pierce U.S. Pat. No. 4,112,793, issued Sept. 12, 1978. Although the device of the Pierce gatent is highly effective for its intended purposes, it has an inherent drawback, attributable to the manner by which the cutting blade is mounted.

As is true of virtually all machines of the kind described in the Pierce patent, the blade, supported to permit it to freely swivel, is positioned to trail slightly behind the axis of pivoting, thereby enabling it to seek an appropriate approach angle. This arrangement is disadvantageous for several reasons.

Most significantly, such machines are not capable of cutting perfect ovals because the blade has a tendency to proceed in a straight line; the deviation from a true elliptical path is particularly noticeable when the minor axis of the shape is relatively small compared to its major axis. Secondly, the trailing blade tends to produce an oval that "leans"; that is, the major and minor axes are tilted slightly from those of a true Cartesian oval. Finally, such an arrangement results in indefiniteness in the starting and finishing points of the blade, often causing those points to be noncoincident, ultimately producing imperfections along the cut.

It is recognized that at least certain of the foregoing deficiencies can be overcome by dynamically orienting the blade so as to maintain its cutting axis constantly tangent to the elliptical path that is generated. A commercially available device that is intended to operate in that general manner utilizes a control arm, attached at one end to a pivotable cutter head, which rotates about and follows, at its opposite end, an oblong cam. The mechanism does not however produce true tangency at all points of the oval, and it is unsatisfactory for other reasons as well; perhaps most notably, it employs no associated support, instead being positioned for use simply by fastening it to a base board through the workpiece itself.

It will also be appreciated that mechanisms and methods carried out for purposes other than cutting, and using functional elements suited to such other purposes, may also suffer from the deficiences hereinabove described, or that they may simply benefit from the incorporation thereinto of the features set forth herein.

Accordingly, it is the broad object of the present invention to provide a novel mechanism, machine and method for circumscribing oval paths.

A more specific object is to provide such a mechanism, machine and method in which a functional axis of a pivotably mounted element is dynamically oriented so as to maintain it in a relationship of true tangency to a circumscribed oval path, at all points therealong.

SUMMARY OF THE INVENTION

It has now been found that certain of the foregoing and related objects of the invention are attained by the provision of a mechanism which includes, in combination: means having a first axis, for mounting an element; means for moving the mounting means along an oval path about a centerline, substantially in a plane; an orientation control system; and movement transmitting means. The means for moving will include a mounting piece and an elongate arm member, the arm member having an outer end portion on which the mounting means is operatively mounted for pivotal movement about a second axis, generally perpendicular to the first axis thereof and parallel to the centerline. The arm member will also have an inner end portion, slidably mounted in the mounting piece for selectively variable extension therefrom along the longitudinal axis of the arm and in a plane spaced above and parallel to the first-mentioned plane.

The orientation control system will comprise a hub, means supporting the hub on the centerline for rotation thereabout, and two parallel slides. One end portion of a first slide will be mounted in the hub for selectively variable extension, radially with respect to the centerline and perpendicular to it, with the other end portion thereof projecting from the hub. The second slide will also have one of its end portions mounted in the hub; its other end portion will have a coupling component on it, and will project in the same direction as does the corresponding end portion of the first slide. The control system will further include an elongate orienting arm having one end portion engaged with the mounting means, and having its other end portion pivotably engaged with the coupling component of the second slide, the arm itself being slidably engaged with either the mounting means or the coupling component.

The transmitting means of the mechanism will transmit movement from the means for moving to the first slide member, so as to effect rotation of the hub about the centerline. It will comprise cooperating components operatively connected to the mounting piece of the means for moving and to the "other" end portion of the first slide member; the component connected to the mounting piece will be of selectively variable position, so as to enable it to follow a circular path about the centerline during operation of the means for moving. As a result, the "first" axis of the mounting means will thereby be constantly maintained in a relationship of substantial tangency to the oval path circumscribed, as the mounting means moves therealong.

Other objects of the invention are attained by the provision of a machine, which comprises the mechanism hereof in combination with other features, hereinafter described.

Yet additional objects are realized by the provision of a method for circumscribing an oval path. The method comprises the steps of moving a pivotably mounted element, which has a functional axis, in a given direction along an oval path, in a plane and about a central axis normal to the plane, the axis of pivotable mounting of the element being generally parallel to the central axis and perpendicular to the functional axis thereof; and moving, in the direction opposite to the "given" direction, a drive element along a circular path concentric with, and in a plane parallel to, that of the oval path. The mounted element and drive element are moved at the same rate of angular speed, and the circular movement of the drive element is translated into reciprocating pivotal movement of the mounted element, about the axis of pivotable mounting, so as to thereby constantly maintain its functional axis substantially tangent to the oval path as the mounted element moves therealong. The diameter of the circular path will usually be equal to the difference between the major and minor diameters of the oval path circumscribed. In a specific embodiment, the method is effected for cutting an oval shape in a workpiece, in which case the mounted element is a blade.

DETAILED DESCRIPTION OF THE ILLUSTRATED EMBODIMENTS

Figure 1:
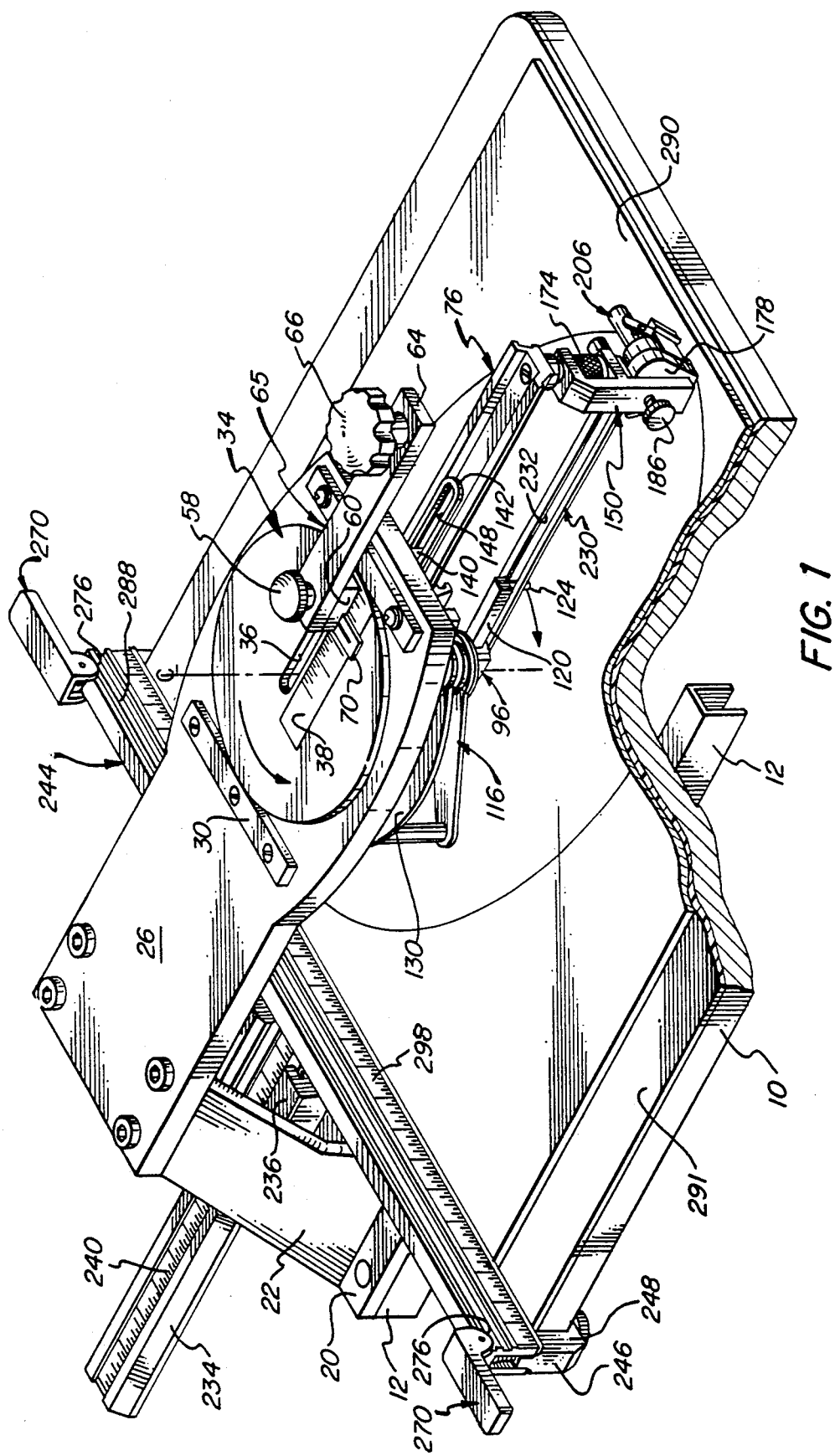
FIG. 1 is a fragmentary perspective view of one form of machine embodying the present invention.
Figure 2:
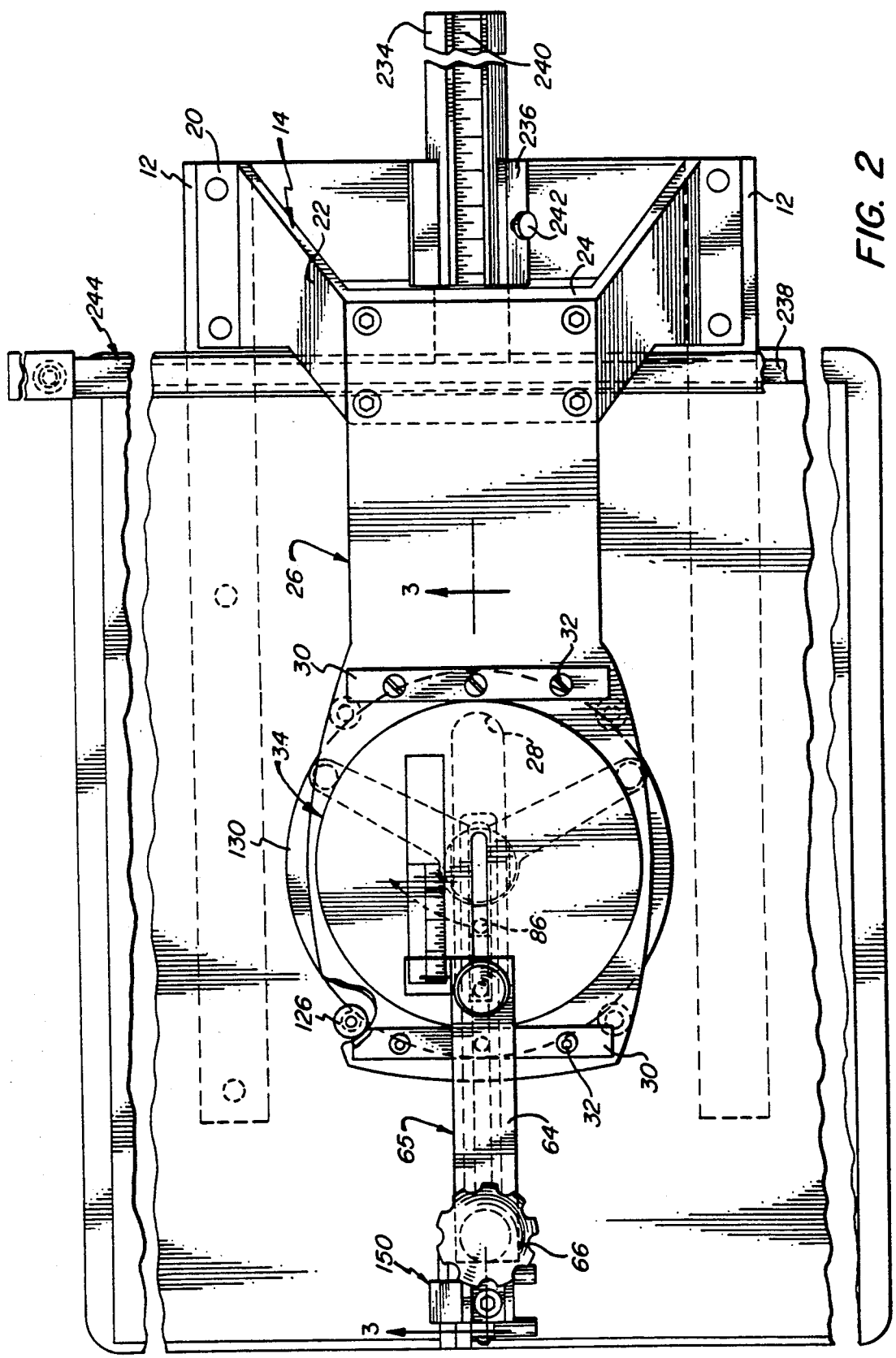
FIG. 2 is a fragmentary plan view of the machine of FIG. 1.
Figure 3:
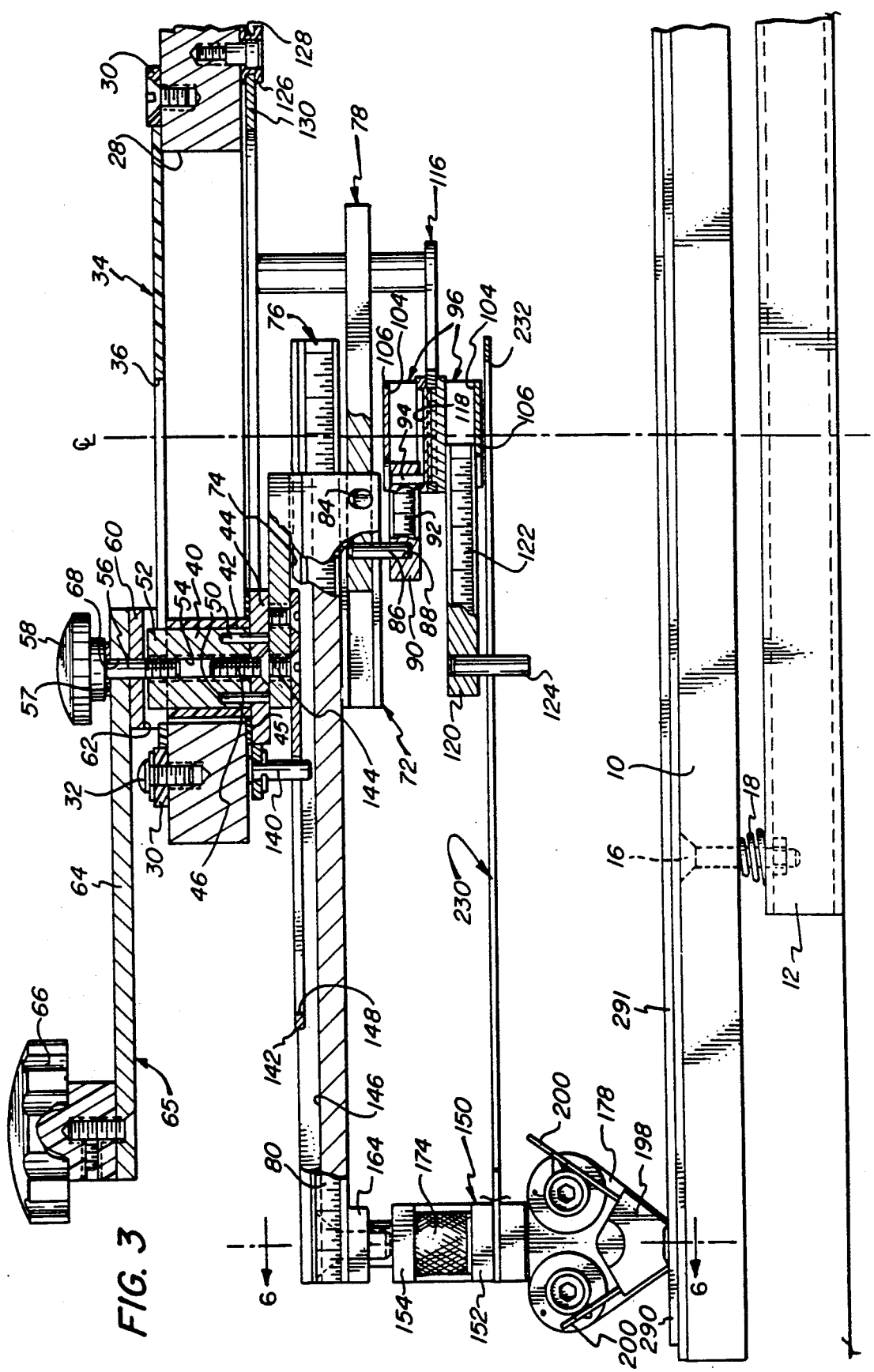
FIG. 3 is a fragmentary sectional view of the machine, taken along line 3—3 of FIG. 2 and drawn to an enlarged scale.
Figure 4:
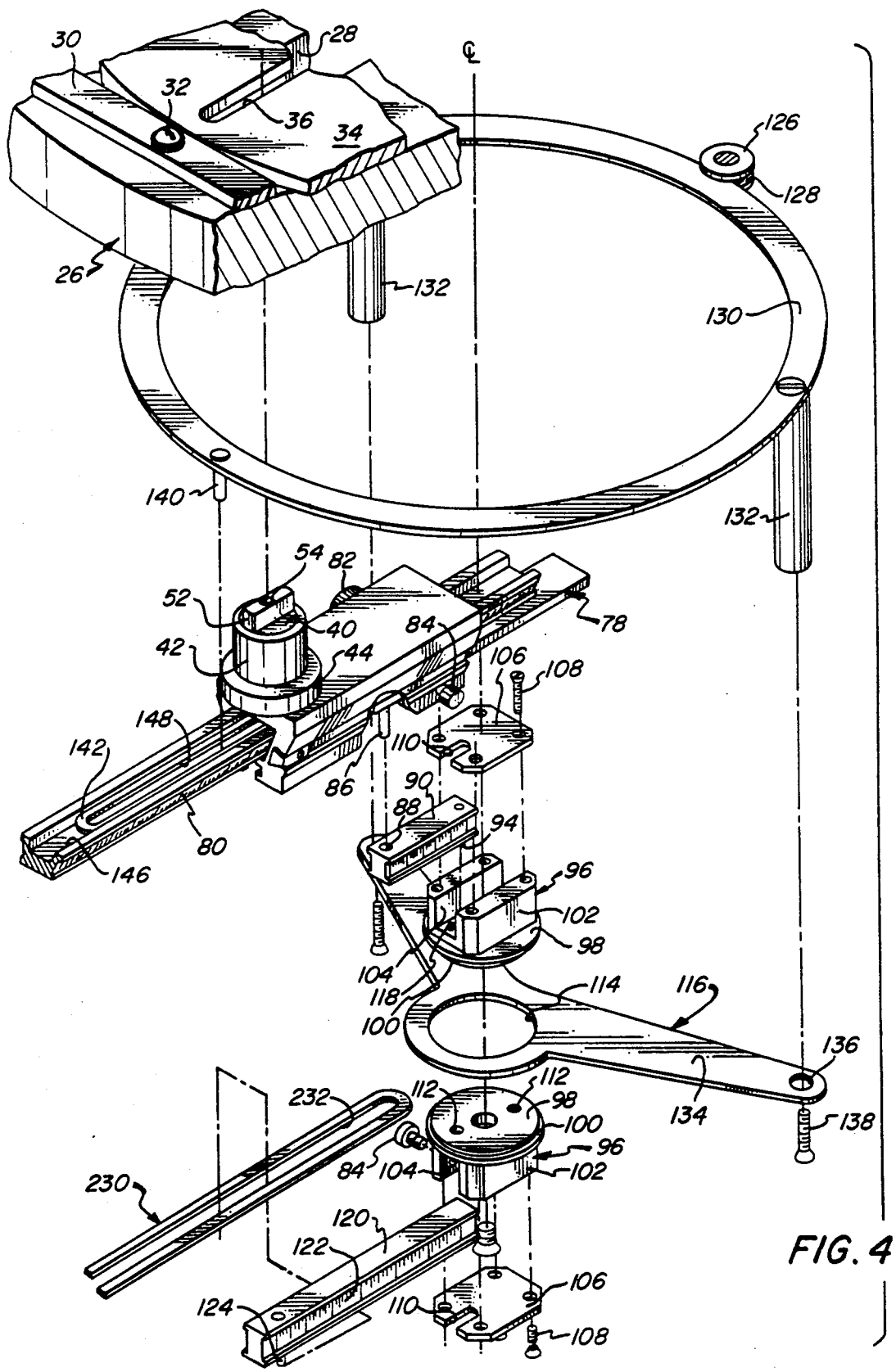
FIG. 4 is a fragmentary, exploded perspective view showing features of the mechanism of the invention by which control of the path of movement, and orientation of the machine cutting head, are achieved.
Figure 5A:
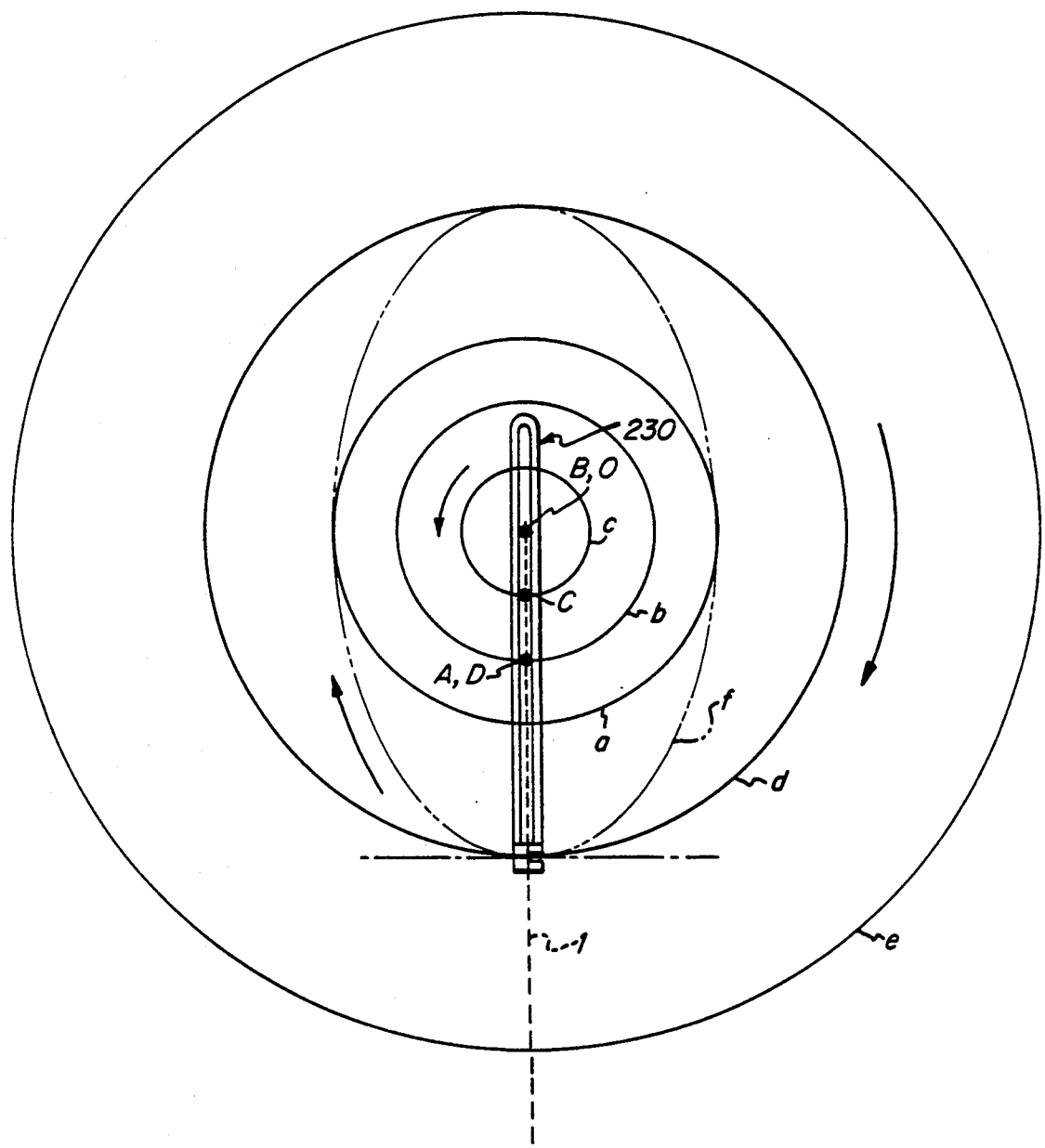
FIGS. 5A-5E are sequential schematic representations showing an orientation control arm at progressive positions during the cutting of one quadrant of an oval, in the embodiment of the foregoing Figures, and also showing geometric elements involved in producing the head orientation control.
Figure 5B:
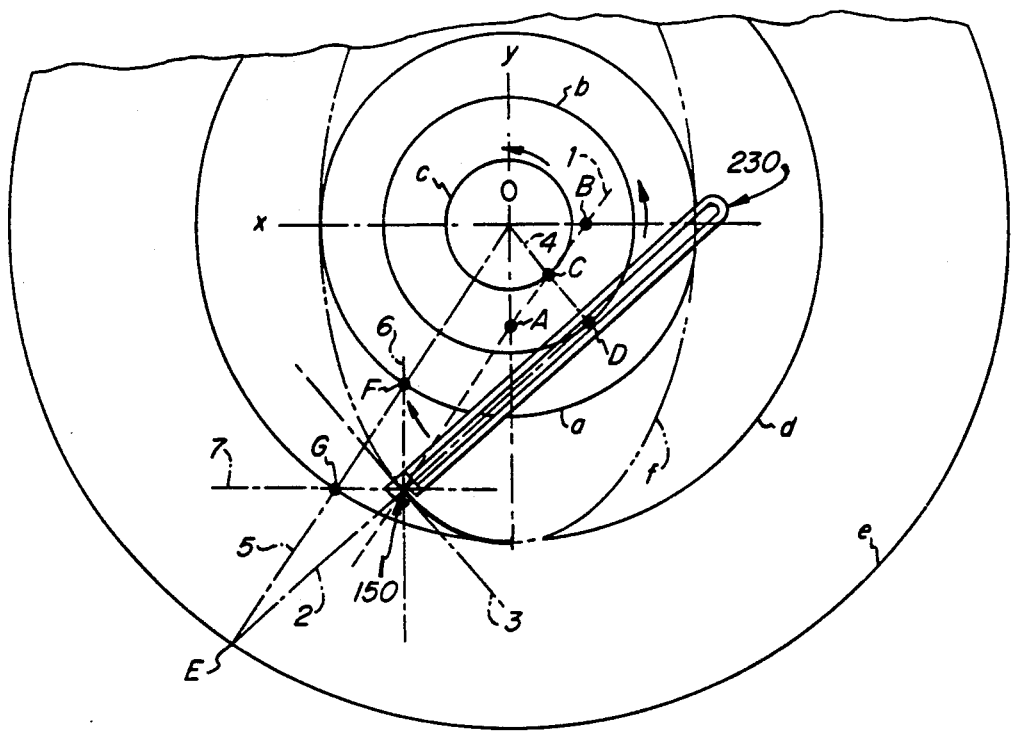
Figure 5C:
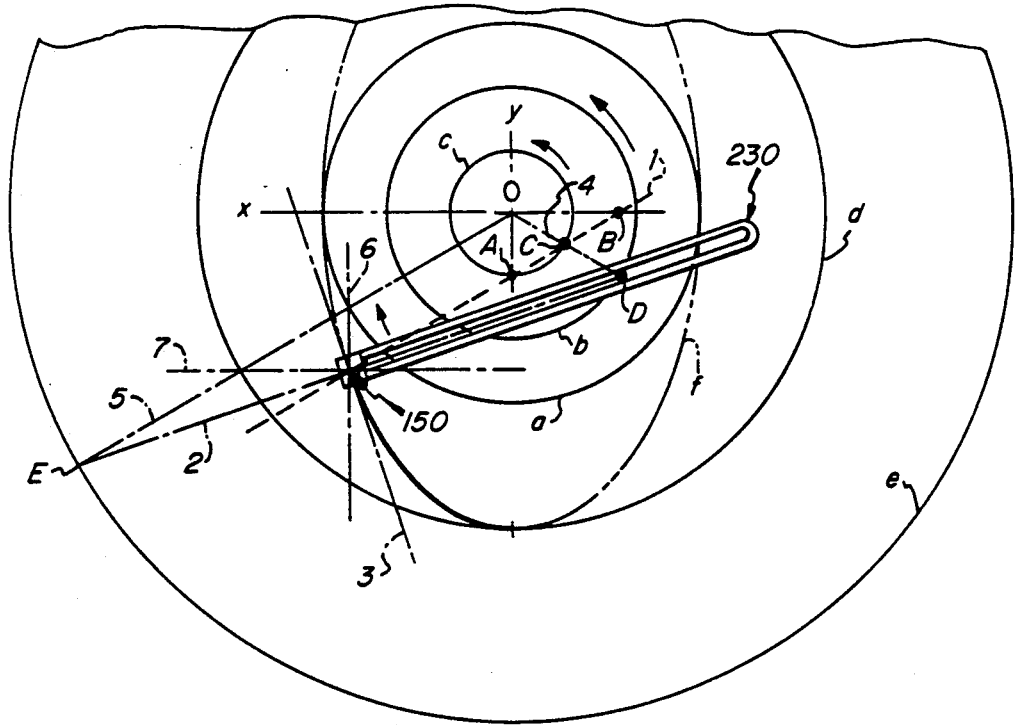
Figure 5D:
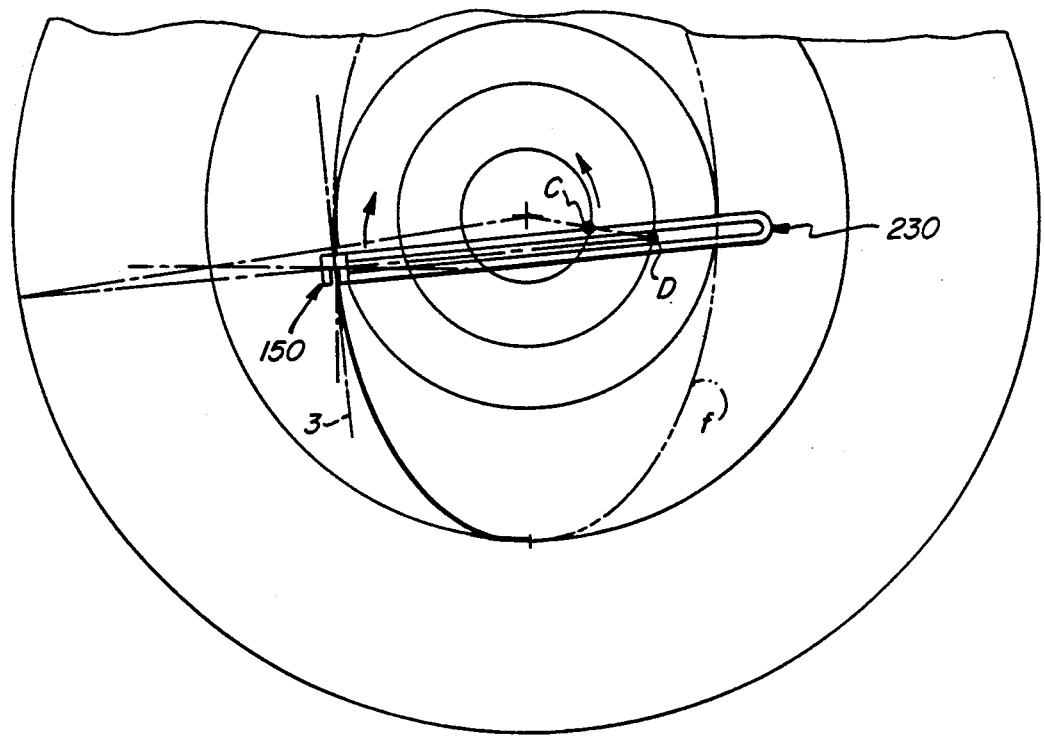
Figure 5E:
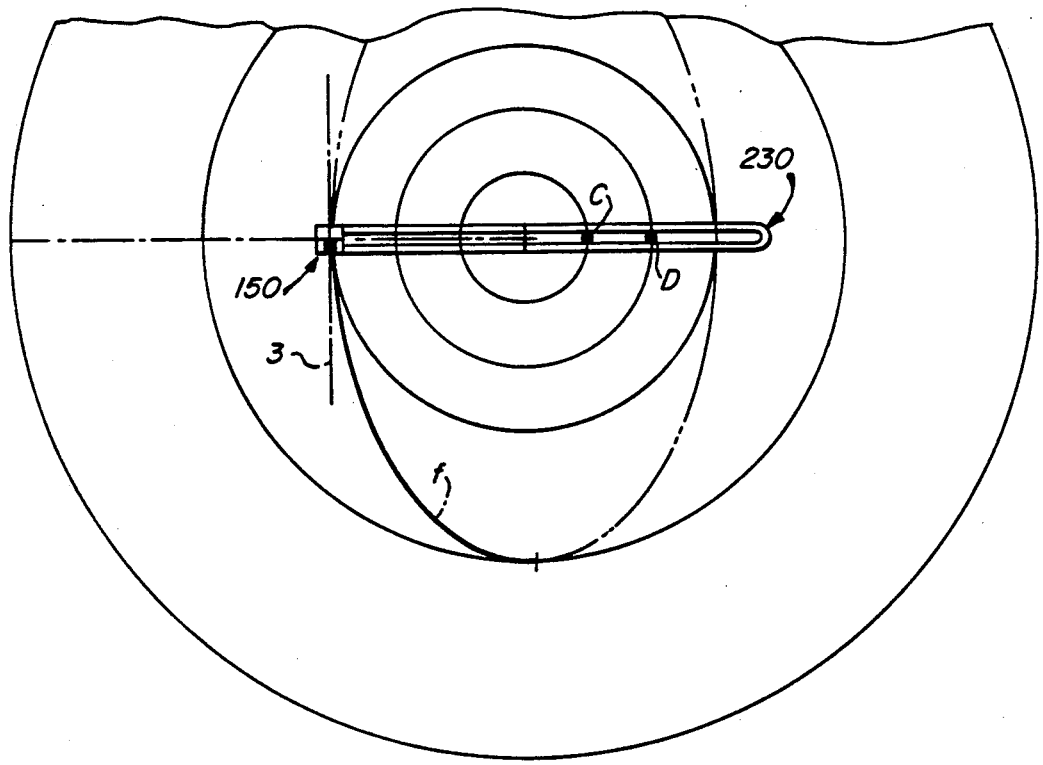

Turning now in detail to FIGS. 1-4 of the appended drawings, therein illustrated is a machine embodying the present invention and including a rectangular base board 10 yieldingly supported upon a pair of U-shaped runners 12, the base board being secured thereto by nut and bolt fasteners 16 (one of which is shown in FIG. 3) with a small conical coil spring 18 interposed therebetween. A stand, generally designated by the numeral 14, is secured to the rear ends of the runners 12 by fasteners passing through flanges 20 at the lower ends of legs 22, and an overhead support arm, generally designated by the numeral 26, is bolted to the upper crosspiece 24 of the stand 14, to project forwardly therefrom over the base board 10.

A slot 28 extends along the longitudinal axis of the arm 26 in the forward, free end portion thereof. Two parallel, rectilinear gibs 30 (normally made of a low-friction synthetic resinous material, such a Delrin) are secured to the upper surface of the arm at the opposite ends of the slot 28. The gibs have smooth inner surfaces, and one of them may be formed with oversized holes for receipt of the screws 32 with which it is held in place on the arm 26, so as to permit fine adjustment to attain strict perpendicularity to the axis of the slot 28. Although not illustrated, the upper surface of the arm 26, in the area between the gibs 30, will normally have a low-friction surface component thereon, such as may be provided by a suitably configured plastic covering washer.

An upper disk, generally designated by the numeral 34, is disposed on the top surface of the arm 26 with its circumferential edge bearing upon the inside surfaces of the two gibs 30. It has a slot 36 therethrough formed along a diametric axis and extending essentially to one side of the center of the disk; a distance scale 38 is provided adjacent the slot 36.

A center shaft assembly is rotatably and slidably received within the slot 28 of the arm 26, and includes a cylindrical center shaft core piece 40 carrying a cylindrical plastic bushing 42, dimensioned to span the slot 28 and to closely engage its lateral surfaces. A lower disk 44 is attached to the core piece 40 by a screw 46, with a plastic washer 45 interposed therebetween, and the components are affixed against relative rotation by pins 50. The upper end of the core piece 40 has a diametrically extending tongue element 52, the parallel side surfaces of which slidably engage the lateral surfaces of the slot 36 of the upper disk 34. Extending axially through the core piece 40 is a threaded bore 54, at the upper end of which is engaged the threaded shank 56 of a clamping knob 58, and at the lower end of which the screw 46 is engaged. A U-shaped clamping block 60 is disposed on top of the disk 34, and has a channel 62 extending through it within which the tongue element 52 of the core piece 40 is received.

The operating handle, generally designated by the numeral 65, consists of a bar 64 with a knob 66 rotatably mounted on one end and with an aperture 68 through its opposite end, the latter receiving the shaft 56 of the clamping knob 58 (with a washer 57 interposed under the head), to thereby attach the handle to the center shaft assembly. The clamping block 60 mounts a laterally extending, transparent indicator piece 70, disposed over the scale 38 so as to permit setting of the center shaft assembly at any selected point along the length of the slot 36; the first line on the scale, nearest the center of the disk, lies at the geometric center thereof. It should be noted that the components are of suitable lengths and thicknesses to ensure that the upper disk 34 will be clamped between the block 60 and the core piece 40 when the knob 58 is tightened, to affix the center shaft assembly to the disk while leaving both free to move relative to the support arm 26.

As will be appreciated by those skilled in the art, the mechanism hereinabove described employs the "Scottish yoke" principle, which is also embodied in the machine shown in the above identified Pierce U.S. Pat. No. 4,112,793. It serves to permit generation of elliptical shapes, each with a major axis that varies from its minor axis by a dimension that is determined by the setting of the center shaft assembly relative to the center of the disk, at an "offset" value. To the extent that it may be helpful to an understanding of the form and operation of the Scottish yoke mechanism employed herein, the specification of the aforesaid said Pierce patent is incorporated hereinto by reference.

An extruded metal (e.g., aluminum) housing, generally designated by the numeral 72, is secured (by screws, not shown) to the lower disk 44 of the center shaft assembly, and has a downwardly opening compound passageway 74 therethrough, which is configured to slidably mount a cutter arm, generally designated by the numeral 76, and a transmission slide, generally designated by the numeral 78. A distance scale 80 is provided along the length of the cutter arm 76, and a clamping screw 82 extends through the wall of the housing 72 and into the passageway 74; it cooperates with a shoe (not seen), which bears upon the side of the cutter arm 76 opposite to that on which the scale 80 is provided, so as to secure the arm in any selected position of extension.

The transmission slide 78 is similarly engaged in selected positions of extension from the housing 72 by use of the locking screw 84. A pin 86, fixed adjacent one end of the slide 78, projects downwardly through the open bottom of the passageway into engagement in a circular socket 88 (normally lined with a press-fit bushing) formed into one end of a halfscale slide 90; a half-dog set screw 94 is affixed to the opposite end of the slide 90, and a distance scale 92 extends longitudinally along one of its side surfaces.

A hub assembly consisting of two substantially identical pieces, each generally designated by the numeral 96, is disposed beneath the housing 72. Hub piece 96 consists of a circular base portion 98 providing a circumferential shoulder 100 thereabout, and a pair of projecting parallel walls 102 define a channel 104 between them. A cover plate 106 is secured over the channel 104 on the end faces of the walls 102 by four screws 108, and the plate is notched at 110 for a reason that will be clear from what follows.

The hub pieces 96 are affixed to one another with the faces of the base portions 98 in confronting contact and with the channels 104 thereof in alignment; they are held together by screws (not shown) engaged within the apertures 112. The shoulders 100 cooperate to form a circumferential groove, by which the assembly is rotatably mounted in the circular opening 114 of an angular mounting bracket, generally designated by the numeral 116; it should be noted that the hub assembly is thereby positioned to rotate on its own axis, coincident with the centerline of the machine.

The half-scale slide 90 is slidably engaged within the channel 104 of the uppermost hub piece 96, the half-dog set screw 94 carried thereby serving to limit extension and thereby to prevent inadvertent disassembly; as can be seen, the tip of the screw 94 is seated within the slot 118 formed into the inner surface of the disk portion 98. The mated hub piece 96 slidably engages an actuating full-scale slide 120, which has a scale 122 along lateral surface and which carries depending pin 124 at its outer end. It should be noted that the actual distance between the integers (and the graduations) of the scales 38, 80 and 122, on the upper disk 34, the cutter arm 76, and the full-scale slide 120, respectively, are the same, whereas the corresponding distances on the scale 92 of the half-scale slide 90 are half those values. The distances shown on the scales 38, 92 and 122 are representative of the offset (in inches) that is to be produced; the distances shown on the scale 80 are representative of the minor diameter value that the oval is to have. The full-scale slide 120 is held in selected positions by use of locking screw 84, which is threadably engaged within the wall 104 of the lower hub piece 96; the half scale slide 90 is held in position by virtue of its connection through pin 86 to the transmission slide 78.

Secured to the underside of the supporting arm 26 are four rollers 126, which are circularly disposed, at suitable intervals, relative to the machine centerline. The rollers 126 engage within their circumferential grooves 128 the outer marginal edge of a support ring 130, for rotation under the arm 26. Two posts 132, separated by 120°, are attached to the ring 130, and they in turn support the angle bracket 116, the ends of the bracket arms 134 being provided with apertures for the receipt of screws 138 for that purpose. As previously noted, the support system is so constructed as to position the center of the circular opening 114 in the angle bracket 116 (and thereby the axis of rotation of the hub assembly) on the centerline of the machine (as so designated in the Figures). The centerline constitutes an axis extending normal to the parallel planes of the upper surfaces of the support arm 26 and the base board 10, at the intersection of the slot 28 with an imaginary medial line extending parallel to the confronting surfaces of the gibs 30, halfway therebetween.

A pin 140 extends downwardly from the ring 130 at a point equidistantly spaced from the posts 132. Bracket 142, attached by screws 144 against the top wall of the housing 72, extends therefrom within a longitudinal channel 146 formed along the tog of the cutter arm 76. The bracket 142 is slotted lengthwise to slidably receive the pin 140 that depends from the ring 130, as a result of which the ring is rotated by action of the cutter arm 76, so as to avoid interference between the arm and the posts 132 that support the bracket 116.

Figures 6, 7, 8:
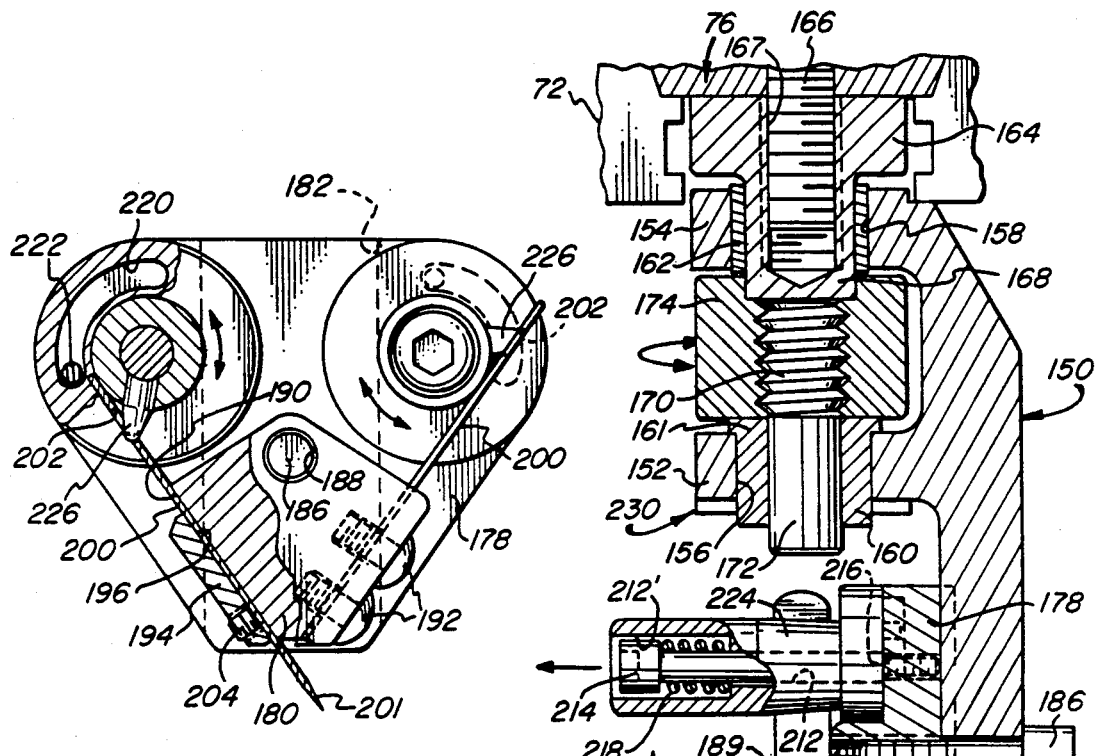
FIG. 6 is a fragmentary sectional view, taken along line 6—6 of FIG. 3 and drawn to an enlarged scale, showing a cutting head, taken along its medial plane, and also showing the support structure therefor, all as employed in the machine of FIGS. 1-4.
FIG. 7 is a perspective view of the cutting head, with the operating dial or spool for one of the blades displaced from the supporting wall, for clarity of illustration.
FIG. 8 is a fragmentary elevational view of the cutting head.
Figure 9:
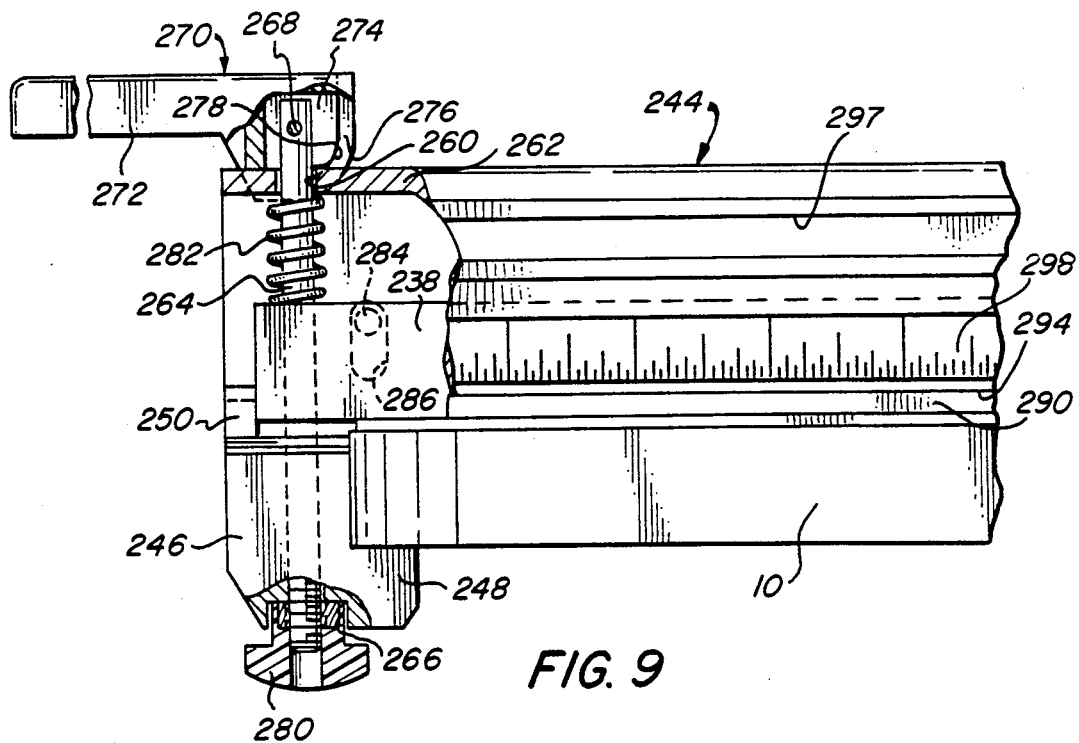
FIG. 9 is a fragmentary front elevational view of a clamping system suitable for use in machines embodying the invention.
Figure 10:
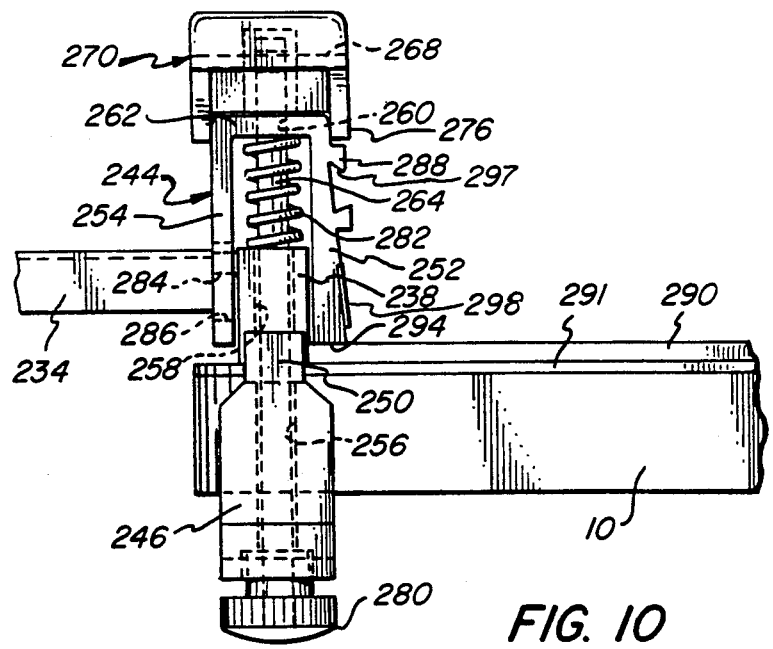
FIG. 10 is a fragmentary end elevational view thereof.

With additional reference now to FIGS. 6–8, the cutter head assembly, mounted upon the free outer end of the cutter bar 76, includes an F-shaped bracket, generally designated by the numeral 150. The laterally extending elements 152, 154 of the bracket are formed with vertically aligned openings 156, 158, within which are seated, respectively, a bushing 160, having an upper retaining flange portion 161, and a bearing sleeve 162.

A mounting post has an enlarged head portion 164 abutted against the bottom surface of the cutter arm 76, and is secured thereto by a screw 166 engaged within its threaded bore 167. The post has two reduced-diameter cylindrical bearing portions 168, 172, which serve to pivotably support the bracket 150, and a threaded intermediate portion 170 therebetween. The threaded portion 170 engages a knurled collar 174, which bears upon the bushing flange portion 161 and is turned to effect adjustment of the vertical position of the bracket 150 on the mounting post.

The cutter head assembly is mounted upon the vertical leg portion 176 of the bracket 150, and includes a body having a lateral wall portion 178 and a base block 180, the leading lower marginal portion 181 of which is covered with a piece 183 of low-friction tape. A medial channel 182 extends along the back surface of the wall portion 178, and slidably engages the leg portion 176 of the bracket to ensure proper orientation of the cutter head, the assembly being maintained by engagement of the screw 186 within the threaded aperture 189.

The base block of the cutter head, which is symmetrical about a medial plane extending vertically through the aperture 189, extends laterally from the wall portion 178 and has downwardly converging surfaces 190 on opposite sides thereof (which are, as will be discussed more fully below, slightly divergent, as well). Secured to each of the surfaces 190, by use of screws 192, is a guideplate 194, the inside surface of which is indented at 196 to define a channel in cooperation with the confronting surface 190. The plates 194 are confined by an outer wall portion 198 on the base block 180.

A flat, planar cutting blade 200 is slidably engaged within each of the channels 196, and has a sharpened bottom edge defined by surfaces 201, and an aperture 202 through the top end thereof. A set screw 204 extends through the plate 194 to bear upon the blade 200, creating (when properly adjusted) frictional resistance to help maintain the blade in any selected position within the channel 196 while permitting ready movement thereof when desired, and also helping to permit manufacture with tolerances of practical magnitude.

The reason for the slight divergence of orientation, mentioned above, is to compensate for the fact that the blades enter the mat at non-perpendicular angles thereto, and to achieve full line contact between the outside surface 201 of the cutting edge (which is of course rectilinear and bevelled relative to the plane of the blade itself) and the cut produced in the workpiece; i.e., to provide as perfectly tangent a relationship as is feasible, and thereby to produce a virtually flawless cut edge regardless of the point of entry or withdrawal of the blade. Consequently, and although not visible in the drawings, the surfaces 190, 196, defining the channels in the base block of the head, are such that the planes of the blades are canted outwardly thereby, typically at an angle of about 5° (which is determined by resolution of the compound angular relationship presented by the several components), causing the blades to diverge from one another in a forward direction (i.e., toward the leading end of the head). As will be appreciated, reference to "outside" surfaces refers to the surfaces that are outermost with respect to the cutting head, one of which outside surface will of course run along the more inward of the lateral surfaces defining a cut edge or a V-groove. It will also be appreciated that the divergence described will dispose the rectilinear axes of the outside surfaces 201 of the cutting edges of the two blades parallel to one another.

Associated with each blade 200 is a positioning dial or spool, generally designated by the numeral 206, and consisting of a circular base portion 208 and cylindrical barrel or handle portion 210. A passageway 212 extends through the spool, and receives a mounting screw 214, the threaded end of which is engaged in a threaded aperture 216 in the lateral wall portion 178 of the cutter head body. The passageway 212 includes an enlarged diameter outer section 212', with a circumferential shoulder formed at the inner end thereof. One end of a coil spring 218 is seated upon the internal shoulder, and the opposite end thereof bears upon the head of the screw 214, thereby creating a biasing force of adjustable strength to displaceably maintain the spool against the wall portion 178. Adjacent the aperture 216 is a semicircular slot 220, within which is engaged a short pin 222 extending from the inner face of the circular base portion 208 of the spool; this serves of course to limit rotation.

A small pin or finger 226 extends radially from a tapered intermediate section 224 of the barrel portion 210, which is engaged within the aperture 202 in the top end of the associated blade 200. As will be self-evident, turning of the positioning spool will serve to raise and lower the coupled blade, to an extent limited by the corresponding slot 220, so as to cause the cutting element thereof to move up and down through the bottom plane of the cutting head (i.e., the plane in which the lower surface of the marginal portion 181 and the tape piece 183 reside). The biasing force of the spring 218 will help to maintain the spool (and thereby the blade) in position, and the blade can be removed entirely from the head by disengagement of the finger 226 on the spool from its aperture 202. This is readily done by withdrawing the spool axially against the force of the spring 218, to disengage the pin 222 from the slot 220 and thereby permit rotation past the fully retracted position of the blade, as necessary to effect the desired disengagement. It will be noted that the edge of the wall portion 178 has a scale 228 on each shoulder, which cooperates with the indicating line 231 on the circumference of the spool base portion to permit reproducible adjustment of the extent of projection of the blade 200 beyond the bottom face 296 of the head.

An orientation control arm, generally designated by the numeral 230, is rigidly attached at one end (as by use of screws, not illustrated) to the underside of the lower bracket element 152, and extends laterally therefrom toward the center of the machine. A slot 232 is formed along most of the length of the arm 230, and engages the pin 124 that depends from the full slide 120.

Centrally mounted at the rear of the stand 14 of the machine is a locking block 236, having a channel in which is slidably received the tail piece 234 of a T-bar. The tail piece 234 has a distance scale 240 extending longitudinally along an upper surface, and the locking block 236 has a thumb screw 242 extending through it and through a clamping shoe (not visible) for securing the tail piece, and thereby the crosspiece 238 attached to its forward end, in any selected position over the base board 10. An inverted, U-shaped clamping member 244 is disposed over the crosspiece 238, and is substantially coextensive therewith.

Identical clamping mechanisms are provided at the opposite ends of the crosspiece and clamping member. Each consists of an L-shaped clamp head 246, having a nose portion 248 engaged under the base board 10 and a neck portion 250 seated within the space between the forward and rearward walls 252, 254 of the clamping member. Extending through aligned bores 256, 258 in the clamp head 246 and the crosspiece 238, respectively, and through an aperture 260 in the top wall 262 of the clamping member, is a rod 264 having a threaded lower end 266 and a transverse pin 268 through its upper end.

An operating lever, generally designated by the numeral 270, is assembled with the rod 264, and includes a handle portion 272 and head portion, the latter comprising sidewalls 276 and an internal element 274, providing arcuate bearing surfaces 278; the opposite ends of the pin 268 are engaged within the sidewalls 276. A nut 280, having a knurled knob thereon, is threadably engaged on the end 266 of the rod 264, and is seated within the clamp head 246. Interposed between the top wall 262 of the clamping member 244 and the upper surface of the crosspiece 238 is a coil spring 282. A small pin 284 (or preferably, a shoulder screw) projects rearwardly from the crosspiece 238, and is engaged within a slot 286 formed through the back wall 254 of the clamping member. The front wall 252 thereof is formed with a rib 288, below which is defined a dovetail groove 297 extending longitudinally therealong; the internal arcuate surface 278 of the lever 270 bears upon the top wall 262.

As will be apparent, in preparation to cut a workpiece such as the mat sheet 290 shown in the drawings the T-bar is initially positioned in the locking block 234 so as to properly locate the mat on the base board 10 (the latter normally having a slip sheet or covering sheet 291 thereupon for optimal utility). The clamping member is provided with a distance scale 298 along its forward wall portion 252, to permit ready centering of the workpiece, and an adjustable measuring stop (not shown) may be slidably mounted in the dovetail groove 297, if so desired, to further facilitate positioning with the clamping member 244 in its elevated position (as shown in the several Figures), a marginal portion of the mat 290 can be inserted beneath the lower edge 294 of the front wall portion 252 to abut against the forward face of the crosspiece 238. Elevating the handle portions 272 of the operating levers 270 will cause the underlying contacting surface (which may have a strip of high-friction and/or cushioning material applied thereto) of the clamping member 244 to be forced downwardly (by the action of the arcuate surfaces 278 upon the cooperating elements), thereby causing the edge surface to tightly grip the marginal portion of the mat 290.

Different thicknesses of workpieces can readily be accommodated by adjustment of the height of the clamping member 244. This is accomplished simply by tightening or loosening of the nuts 280, thereby raising or lowering the clamping member, as necessary.

To commence the cutting operation, the cutter arm 76 will be extended from the housing 72 a distance corresponding to the minor axis of the oval shape that is to be cut, utilizing the scale 80 thereon (which may be read directly to indicate the minor diameter). The knob 58 is loosened to permit shifting of the upper disk 34 (which would normally be done with the handle rotated 90° from the position shown in FIG. 1, so as to align the slot 36 with the gibs 30) to establish the desired offset, utilizing the indicator 70 in cooperation with the scale 38 on the disk 34; the sum of the offset value plus the cutter arm extension reading will equal the value of the major diameter of the oval to be cut. The coupled transmission bar 78 and the half-scale slide 90 are also extended from the housing 72 and the upper hub piece 96, respectively, to provide the same offset reading on the scale 92 as is indicated on the scale 38; the actuating slide 120 is extended from the lower hub piece 96 in which it is mounted, once again to provide the same offset reading on the scale 122.

The knurled collar 174 is thereafter rotated so as to bring the tape covered face 296 of the cutter head into sliding contact with the mat 290 (the tape 183 serving of course to promote sliding thereupon, and to prevent scuffing of the surface). Depending upon whether the mat is being cut from what is to be its front or its rear surface, one or the other of the blades 200 will then be extended as necessary to produce the desired degree of penetration, by turning of the associated spool 206.

Moving the handle 65 (in a counterclockwise direction) will of course cause the disk 34 and the center shaft assembly to rotate in the same direction. Due to the constraints imposed by the gibs 30 however, the center shaft assembly will be forced to slide along the slot 28 in the upper support arm 26, while the disk migrates back and forth along an axis parallel to the faces of the gibs. This will superimpose the established offset distance upon the otherwise circular path of the cutter head 150, thereby causing it to circumscribe an oval. (As will be self-evident, if the center shaft assembly were positioned at the center of the disk 34 the resultant shape would be that of a circle, since no offset would be imposed.)

As the center shaft rotates on its own axis, and simultaneously moves back and forth through the centerline of the machine, the geometry of the system (with the slides set as described) will cause the pin 86 on the transmission bar 78 to follow a circular path, in a clockwise direction (i.e., opposite to the direction of rotation of the disk 34). As a result, the hub assembly will rotate in the same direction within the center bracket 116, in turn causing the pin 124 to move clockwise and to circumscribe a circular path.

Rotational movement of the pin 124 (following its circular path) within the slot 232 of the orientation bracket 230 will translate to a reciprocating pivotal action to the cutter head 150. Again due to geometric principles (which will be discussed hereinbelow), pivoting of the head under such control will constantly maintain the cutting (i.e., the functional) axis of blade 200 in a relationship of true tangency to the oval path being followed, thereby producing a virtually perfect cut in the mat 290.

To enable the pin 86 to move in a circle, in response to the compound movements of the center shaft assembly, it is necessary that the radius of the path circumscribed by the pin 86 (taken from the centerline of the machine) be exactly onehalf the value of the offset distance set on the scale 38. To facilitate that, the actual distances between indicia on the scale 92 on the half-scale slide 90 are one-half those that are provided between common indicia on the scale 38; thus, one need only set the cooperating parts at the same integer or graduation markings on the scales to achieve the required relationship. The distances on the scale 122 of the actuating slide 120 are the same as those on scale 38, to facilitate setting of the slide so as to enable the pin 124 to follow a path (about the centerline) having a radius equal to the offset distance, as is necessary to produce the required orientation control for the cutter head. As noted previously, the markings on the scale 80 denote minor diameter lengths, and so the actual distances between integers are half of the values indicated.

The cutting head employed on the machine can readily be utilized for so-called "V-grooving" of mat board. To do so it is simply a matter of making a first cut with one of the blades in operative position, and thereafter making a second cut, along the same path, utilizing the other blade. As has been noted, the surfaces of the base portion against which the blades are mounted converge at an angle suitable to cause the blades to produce, by their cooperative action, a V-shaped cut.

It might also be emphasized that the mechanism, machine, and method of the invention, and the underlying concepts, are applicable not only for cutting or scoring of workpieces such as mat board, plastic and glass, but also for performing other operations (e.g., grinding, milling, optical inspection, etc.) on, or with respect to, any of numerous kinds of workpieces; thus, the term "circumscribed" is used in a broad sense herein, to encompass all of such operations. Different forms of mounting means and elements, appropriate to the material of the workpiece and to the function that is to be carried out, will of course be employed and will depend upon the nature of the particular application involved. As another example, a cutting head body could be fitted with an embossing wheel, to add desired aesthetics to the workpiece; such a wheel is conventionally formed with a rounded circumferential edge cross section, and is used to impress an indentation in the surface of a mat board along the travel path of the head.

Turning finally to FIGS. 5A-5E of the drawings, therein illustrated schematically and sequentially is the manner in which the cutter head orienting bracket, or other mounting means of the instant mechanism, moves while circumscribing one quadrant of an oval, so as to control its orientation and thereby maintain the blades, or other mounted element, with functional axes thereof in relationships of precise tangency. Needless to say, an axis of the mounting means, parallel to the functional axis of an operative element, will simultaneously be dynamically maintained in such tangential relationships. The Figures also illustrate the geometric principles underlying the operation of the machine illustrated. (It should be noted that the directions of movement are arbitrarily chosen to be opposite to those entailed in the machine embodiment hereinbefore described.)

As the cutting head moves along an oval path "f", the locus of a point "C" on the axis of the cutter bar 76 (the bar axis being represented by the dash line "1" in these Figures) is a circle "c" generated in the direction opposite to that in which the cutter head proceeds. Orientation of the cutter bar is controlled by constraining points A and B (separated by the offset distance) on its axis to movement on perpendicular y and x axes through the point "O" at the center of the machine (and hence at the center of the oval shape "f" generated); point "A" corresponds to the rotational axis of the center support assembly of the machine, and point "B" may be considered to be the geometric center of disk 34, which follows an imaginary point on the axis of the cutter bar moving along an axis midway between the confronting gib surfaces. Since the pin 86 of the machine is positioned at point C, midway between points A and B, it generates the circle "c" having a radius equal to half the offset distance.

In the Figures, the diameter of circle "a" corresponds to the minor diameter of the oval "f", and the radius of circle "b" equals the machine offset distance. Adding the diameter of circle "b" to the minor diameter circle "a" provides the major diameter of the oval, corresponding to the diameter of circle "d"; circle "e" is drawn to have the diameter of tangency, equal to the sum of the major and minor diameters. For example, setting the cutter bar to provide a six-inch minor diameter, and setting the upper disk to provide a two-inch offset, will produce an ellipse with an eight-inch major diameter. If the same offset value is set on the scales 92 and 122, the locus of pin 86 will be a two-inch diameter circle, and that of pin 124 will be a circle having a four-inch diameter.

As can be seen, and by way of explanation of the theory of operation of the mechanism, a line "2" drawn through point D on the offset radius circle "b", and point E on the tangency circle "e", will be perpendicular to a line of tangency "3" at all points on the oval "f". Consequently, disposing the arm 230 between the cutter head bracket 150 and the pin 124 (the latter corresponding to point D, at the offset distance and aligned on an axis "4" through the center point "O" and point "C") will impart the desired, always-tangent orientation to the axis of cutting of blade 200. It will be appreciated that the alignment of points "O", "C" and "D" on the axis "4" is produced in the machine by the relationships of the half-scale and full-scale slides 90, 120 in the hub assembly.

Point "E" on the tangency circle "e" lies at the intersection of a line drawn parallel to the axis "1" of the cutter bar through the center point "O". The cutting blade 200 is located at the intersection of lines "6" and "7", drawn parallel to the y and x axes of the machine from points F and G, respectively; points "F" and "G" lie at the intersections of line 5 with minor and major diameter circles "a" and "d". (It will be noted that some of the reference lines and points have been omitted from certain Figures, for clarity of illustration.)

As will be appreciated, the dynamic position of point D will reside at the intersection with circle "b" of a line through point A drawn parallel to the x axis, and also of a line through point B drawn parallel to the y axis, the intersection of both lines with circle "b" serving of course to locate point D in the groper quadrant. The foregoing geometric factors can readily be applied in the design of a mechanism having the unique true tangent characteristic herein described; it is not believed that these principals have heretofore been recognized, or so applied.

Thus, it can be seen that the present invention provides a novel mechanism, machine and method for circumscribing oval paths. More specifically, in the mechanism, machine and method the functional axis of a pivotably mounted element is dynamically oriented so as to maintain true tangency of that axis to any circumscribed oval path, at all points therealong.

Having thus described the invention, what is CLAIMED is:

1. A mechanism for circumscribing an oval path, comprising in combination:
   (a) mounting means for mounting an element, said mounting means having a first axis;
   (b) means for moving said mounting means along an oval path substantially in a plane and about a centerline, said means for moving including a mounting piece and an elongate arm member, said arm member having an outer end portion on which said mounting means is operatively mounted for pivotal movement about a second axis generally perpendicular to said first axis and parallel to said centerline, and having an inner end portion slidably mounted in said mounting piece for selectively variable extension therefrom, along the longitudinal axis thereof and in a plane spaced above and parallel to said first-mentioned plane;
   (c) an orientation control system, comprising:
      (1) a hub;
      (2) means supporting said hub on said centerline for rotation thereabout;
      (3) a first slide having opposite end portions, one of said end portions being mounted in said hub for selectively variable extension therefrom, radially with respect to said centerline and perpendicular thereto, with the other end portion of said first slide projecting from said hub;
      (4) a second slide having opposite end portions, one of said end portions being mounted in said hub in the same manner as said first slide and parallel to said first slide, the other of said end portions of said second slide having a coupling component thereon, said other end portions of said first and second slides both projecting in the same direction from said hub; and (5) an elongate orienting arm having opposite end portions, one of said end portions of said arm being operatively engaged with said mounting means, and the other of said end portions of said arm being pivotably engaged with said coupling component of said second slide, said orienting arm being slidably engaged with one of said mounting means and said coupling component; and (d) means for transmitting movement from said means for moving to said first slide member so as to effect rotation of said hub about said centerline, said means for transmitting comprising cooperating components operatively connected to said mounting piece of said means for moving and to said other end portion of said first slide member, one of said components connected to said mounting piece being of selectively variable position so as to enable it to follow a circular path about said centerline during operation of said means for moving; whereby, as said mounting means moves along an oval path said first axis may be constantly maintained substantially tangent to said path.

2. The mechanism of claim 1 wherein said means for transmitting further comprises a third slide, slidably mounted in said mounting piece for movement of said one cooperating component of said means for moving along an axis parallel to said longitudinal axis of said arm member.

3. The mechanism of claim 1 wherein said first and second slides both have scales thereon for indicating the distance of extension thereof, said slide scales having indicia thereon in common, with the indicia on said first slide scale being spaced half the actual distance of that o; said common indicia on said second slide scale.

4. A machine for causing an element to circumscribe an oval path comprising, in combination, the mechanism of claim 1; a base having a flat upper surface in a plane parallel to said first-mentioned plane; a frame united with said base; and an overhead support member on said frame, said support member having a plate portion overlying said base upper surface.

5. The machine of claim 4 wherein said plate portion has a rectilinear slot therethrough traversing said centerline, and has constraining means thereon for constraining a circular component disposed on said plate portion to rectilinear movement along an axis of reciprocation that is perpendicular to the axis of said slot and that also traverses said centerline, said means for moving additionally including:

(1) a circular component slidably disposed on said plate portion of said support member and movable along an axis of reciprocation under the constraint of said constraining means, said circular component having an elongated slot therethrough extending diametrically and traversing the center thereof;

(2) a center shaft assembly including a shaft component slidably engaged within said diametrical slot, and means for disengagably affixing said shaft assembly against movement relative to said circular component at selectively variable positions along the length thereof, said shaft component also being slidably and rotatably engaged within said slot of said plate portion, and being adapted to effect rotary motion of said circular component and lineal motion thereof along said axis of reciprocation, when affixed thereto; and (3) driving means for effecting rotation of said center shaft assembly, said mounting piece being operatively connected to said shaft assembly for movement therewith.

6. The machine of claim 5 wherein said driving means comprises a handle with a bar attached adjacent one end to said center shaft assembly, and having manual gripping means adjacent the opposite end, said bar having a longitudinal axis aligned with the longitudinal axis of said elongate arm member and being disposed thereover, said one end of said bar being disposed to the same side of said shaft assembly as said outer end of said arm member.

7. The machine of claim 4 wherein said means for supporting said hub comprises a bracket assembly operatively supported by said frame to dispose said hub at a level between said overhead support member and said base.

8. The machine of claim 7 wherein said bracket assembly is rotatably mounted on said overlying plate portion of said frame, and wherein said machine includes driving means operatively engaged with said bracket assembly and said elongate arm member for rotation thereof at the same angular rate so as to avoid interference between any component of said bracket assembly and said arm member.

9. In a method for circumscribing an oval path, the steps comprising:

moving a pivotably mounted element, having an axis of pivotable mounting and having a functional axis, in a given direction along an oval path in a plane and about a central axis normal to said plane, said axis of pivotable mounting of said element being generally parallel to said central axis and perpendicular to said functional axis:

moving, in the direction opposite to said given direction, a drive element along a circular path concentric with and in a plane parallel to that of said oval path, said mounted element and said drive element being moved at the same rate of angular speed; and translating the circular movement of said drive element into reciprocating pivotal movement of said mounted element, about said axis of pivotable mounting, so as to constantly maintain said functional axis substantially tangent to said oval path as said mounted element moves therealong.

10. The method of claim 9 wherein said oval path has a major and a minor diameter, and wherein the diameter of said circular path is equal to the difference between said major and minor diameters.

11. The method of claim 9 wherein said mounted element is a cutting element and said functional axis is the axis of cutting thereof, said method being effected for cutting an oval shape in a workpiece disposed in said plane.

* * * * *